United States Patent
Brojanac et al.

(10) Patent No.: US 8,402,798 B2
(45) Date of Patent: Mar. 26, 2013

(54) LOCKING CLAMP

(75) Inventors: Michael Brojanac, Jackson, WI (US); Mark Johnson, Hubertus, WI (US); Frank Scott, Milwaukee, WI (US); John Weber, Thiensville, WI (US)

(73) Assignee: Master Lock Company LLC, Oak Creek, WI (US)

( * ) Notice: Subject to any disclaimer, the term of this patent is extended or adjusted under 35 U.S.C. 154(b) by 659 days.

(21) Appl. No.: 12/110,652

(22) Filed: Apr. 28, 2008

(65) Prior Publication Data

US 2009/0266119 A1   Oct. 29, 2009

(51) Int. Cl.
*E05B 73/00* (2006.01)
*F16K 35/00* (2006.01)

(52) U.S. Cl. .............. 70/19; 70/177; 269/90; 269/212; 137/385

(58) Field of Classification Search .............. 137/385; 251/93, 288; 269/86, 90, 207, 212, 315, 269/3, 6, 143, 249; 70/175, 177, 14, 18, 70/19, 58, 209, 225, 226; 29/257
See application file for complete search history.

(56) References Cited

U.S. PATENT DOCUMENTS

| | | | |
|---|---|---|---|
| 112,693 A | 3/1871 | Davis |
| 385,134 A | 6/1888 | Prentice |
| 475,530 A | 5/1892 | Zimmerman, Jr. |
| 484,759 A | 10/1892 | Stiner |
| 492,313 A | 2/1893 | Tower |
| 548,370 A | 10/1895 | Kitzler |
| 604,197 A | 5/1898 | Smith |
| 592,183 A | 10/1898 | Whittier et al. |
| 743,134 A | 11/1903 | Baker |
| 752,818 A | 2/1904 | Boulter |
| 753,349 A | 3/1904 | Bacon |
| 757,652 A | 4/1904 | Edwards |
| 822,484 A | 6/1906 | Schmitt |
| 832,106 A | 10/1906 | Werner |
| 878,368 A | 2/1908 | Feighan |
| 902,917 A | 11/1908 | Schoen |

(Continued)

FOREIGN PATENT DOCUMENTS

JP          05-019036          3/1993

OTHER PUBLICATIONS

International Search Report and Written Opinion from International Application No. PCT/US2009/038207, mailed May 18, 2009.

(Continued)

*Primary Examiner* — John Rivell
*Assistant Examiner* — Kevin Murphy
(74) *Attorney, Agent, or Firm* — Calfee, Halter & Griswold LLP (57) ABSTRACT

A locking clamp device is provided with first and second clamping members. The first clamping member includes a base member with a first clamping surface and a locking member movable with respect to the base member between a securing position and a releasing position. The second clamping member is slidably engaged with the first clamping member and selectively movable to a plurality of clamping positions. The second clamping member includes a second clamping surface opposite the first clamping surface. The lockout device further includes a means for preventing movement of the locking member from the securing position to the releasing position. The locking member is configured to secure the second clamping member in one of the plurality of clamping positions when the locking member is in the securing position.

15 Claims, 8 Drawing Sheets

U.S. PATENT DOCUMENTS

| | | | |
|---|---|---|---|
| 907,479 A | 12/1908 | Ebert | |
| 915,005 A | 3/1909 | Wiley | |
| 923,090 A | 5/1909 | Toback | |
| 939,108 A | 11/1909 | Swank | |
| 988,378 A | 4/1911 | Olson | |
| 1,015,094 A | 1/1912 | Stift | |
| 1,033,314 A | 7/1912 | Hall | |
| 1,057,609 A | 4/1913 | Young | |
| 1,111,618 A | 9/1914 | Schoof | |
| 1,150,305 A | 8/1915 | Shedd | |
| 1,151,304 A | 8/1915 | Svoboda | |
| 1,240,734 A | 9/1917 | Koeppe | |
| 1,245,770 A | 11/1917 | Rideout | |
| 1,348,364 A | 8/1920 | Koebel | |
| 1,412,720 A | 4/1922 | Szarfranski | |
| 1,473,775 A | 11/1923 | Leech, Jr. | |
| 1,498,953 A | 6/1924 | Costello | |
| 1,499,663 A | 7/1924 | Kaiser | |
| 1,554,086 A | 9/1925 | Haller | |
| 1,556,567 A | 10/1925 | Brown | |
| 1,561,059 A | 11/1925 | Danko | |
| 1,574,791 A | 3/1926 | Clark | |
| 1,589,316 A | 6/1926 | Kaiser | |
| 1,590,032 A | 6/1926 | Jauch | |
| 1,590,074 A | 6/1926 | Booker | |
| 1,601,620 A | 9/1926 | Haller | |
| 1,605,351 A | 11/1926 | Koronski | |
| 1,618,307 A | 2/1927 | Pieczonka | |
| 1,628,150 A | 5/1927 | Jerdone, Jr. | |
| 1,692,188 A | 11/1928 | Roose et al. | |
| 1,694,086 A | 12/1928 | Waselak | |
| 1,749,491 A * | 3/1930 | Kokay | 269/215 |
| 1,796,900 A | 3/1931 | Snow | |
| 1,867,922 A * | 7/1932 | Nelson | 269/315 |
| 1,877,529 A | 9/1932 | Platt | |
| 1,879,482 A | 9/1932 | Quintenz | |
| 1,894,660 A | 1/1933 | Black et al. | |
| 1,923,025 A | 8/1933 | Morse et al. | |
| 2,271,475 A | 1/1942 | Clade | |
| 2,323,654 A * | 7/1943 | Gordy et al. | 269/90 |
| 2,350,354 A | 6/1944 | Herskovits | |
| 2,399,578 A | 4/1946 | Smith | |
| 2,648,517 A | 8/1953 | Berland et al. | |
| 2,699,916 A | 1/1955 | Johnson | |
| 2,724,295 A * | 11/1955 | Persson | 269/215 |
| 2,746,478 A | 5/1956 | Johnson | |
| 3,156,256 A | 11/1964 | Weaver | |
| 3,186,196 A | 6/1965 | Moberg | |
| 3,333,812 A | 8/1967 | Mueller | |
| 3,401,715 A | 9/1968 | Johnson et al. | |
| 3,599,960 A * | 8/1971 | Phillips | 269/182 |
| 3,865,130 A | 2/1975 | Mullis | |
| 3,866,446 A | 2/1975 | Lemley | |
| 3,960,168 A | 6/1976 | Plympton | |
| 3,976,095 A | 8/1976 | Koch et al. | |
| 4,126,023 A | 11/1978 | Smith et al. | |
| 4,162,690 A | 7/1979 | Anderson | |
| 4,458,510 A | 7/1984 | Nielsen | |
| 4,483,366 A | 11/1984 | Labita | |
| 4,498,320 A | 2/1985 | Mullis | |
| 4,534,379 A | 8/1985 | Burge | |
| 4,781,044 A | 11/1988 | Ortega | |
| 4,843,846 A | 7/1989 | Wagner | |
| 4,848,724 A | 7/1989 | Pettinaroli | |
| 4,872,327 A | 10/1989 | Wagner | |
| 4,926,900 A | 5/1990 | Pietras | |
| 4,971,289 A | 11/1990 | Pietras | |
| 5,003,767 A | 4/1991 | Podgers | |
| 5,003,797 A | 4/1991 | Wirth et al. | |
| 5,014,528 A | 5/1991 | Roberts | |
| 5,052,655 A | 10/1991 | Ackroyd | |
| 5,058,622 A | 10/1991 | Chitty, Jr. et al. | |
| 5,115,834 A | 5/1992 | Champagne | |
| 5,139,041 A | 8/1992 | Albrecht | |
| 5,143,114 A | 9/1992 | Daniels | |
| 5,165,263 A * | 11/1992 | Perron et al. | 70/177 |
| 5,183,073 A | 2/1993 | Roberts | |
| 5,188,335 A | 2/1993 | Pettinaroli | |
| 5,213,308 A * | 5/1993 | Jeromson et al. | 251/95 |
| 5,300,740 A * | 4/1994 | Benda | 200/43.14 |
| 5,305,622 A | 4/1994 | Flores | |
| 5,323,805 A | 6/1994 | Scaramucci | |
| 5,360,036 A | 11/1994 | Kieper | |
| 5,365,759 A | 11/1994 | Bonomi | |
| 5,368,066 A | 11/1994 | Scaramucci | |
| 5,375,916 A | 12/1994 | Cook | |
| 5,411,048 A | 5/1995 | Massey | |
| 5,415,017 A | 5/1995 | Benda et al. | |
| 5,427,135 A | 6/1995 | Kieper | |
| 5,579,804 A | 12/1996 | Roberts | |
| 5,598,724 A | 2/1997 | Primeau | |
| 5,709,112 A | 1/1998 | Kennedy | |
| 5,785,074 A | 7/1998 | Kieper | |
| 5,797,285 A | 8/1998 | Sackowitz | |
| 5,799,687 A | 9/1998 | Eckel et al. | |
| 5,806,555 A | 9/1998 | Magno, Jr. | |
| 6,119,494 A | 9/2000 | Whitfield | |
| 6,148,851 A | 11/2000 | Friedline et al. | |
| 6,568,422 B2 | 5/2003 | Niessen | |
| 6,604,391 B2 | 8/2003 | Vellette et al. | |
| 6,622,536 B1 | 9/2003 | Fuller et al. | |
| 6,718,804 B1 | 4/2004 | Graves et al. | |
| 6,832,623 B2 | 12/2004 | Johnson et al. | |
| 6,959,909 B2 | 11/2005 | Bancroft et al. | |
| 7,044,148 B2 | 5/2006 | Berger et al. | |
| 7,114,698 B2 | 10/2006 | Espinoza | |
| 7,152,621 B1 | 12/2006 | Huetinck | |
| 2003/0164011 A1 | 9/2003 | Fuller et al. | |
| 2006/0272365 A1* | 12/2006 | Copus | 70/14 |

OTHER PUBLICATIONS

Notice of Reasons for Rejection from Japanese Patent Application No. 2011-507509, dated Nov. 6, 2012.

* cited by examiner

LOCKING CLAMP

BACKGROUND OF THE INVENTION

Security devices, such as for example, padlocks and other types of conventional locks are known in the art. Many security devices are provided for restricting access to equipment and control instruments, including, for example, electrical components, such as switches, dials and push buttons, and fluid system components, such as valves and pressure regulators. One exemplary security device is a valve lockout device to prevent the operation of a valve, which may be utilized during maintenance of an associated fluid system or under other conditions in which the flow setting of the valve must not be changed.

One type of valve for which lockout devices have been provided is a manually operated valve in which an actuating member, such as, for example, a valve stem, extends from a valve body and may be rotated or otherwise moved to alter the flow of a system fluid through the valve. Examples of such valves include ball valves, gate valves, needle valves, and diaphragm valves. With many such valves, a valve handle is attached to the actuating member to facilitate movement of the actuating member by providing an extension that is easy to grasp and manipulate.

Some conventional valve lockout devices are fitted to the valve body and/or handle to restrict movement of the handle with respect to the valve body. Due to the large number of valve manufacturers and the wide variety of valve sizes, conduit sizes, valve body shapes and valve handle dimensions, the types of valves with which a single conventional lockout device design may be used is limited, requiring retention of several types or sizes of lockout devices to accommodate the many types and sizes of valves in service at a typical plant.

SUMMARY OF THE INVENTION

The present invention relates to a locking clamp that may be secured or locked in one or more clamping positions. In one embodiment, a locking clamp device is provided with first and second clamping members. The first clamping member includes a base member with a first clamping surface and a locking member movable with respect to the base member between a securing position and a releasing position. The second clamping member is slidably engaged with the first clamping member and selectively movable to a plurality of clamping positions. The second clamping member includes a second clamping surface opposite the first clamping surface. The locking clamp further includes a means for preventing movement of the locking member from the securing position to the releasing position. The locking member is configured to secure the second clamping member in one of the plurality of clamping positions when the locking member is in the securing position.

While a locking clamp in accordance with the inventive features of the present application may be used in a variety of applications, in one embodiment, a locking clamp may be configured for use as a lockout device for operable instruments, including fluid systems components, such as, for example, shutoff valves.

BRIEF DESCRIPTION OF THE DRAWINGS

Further features and advantages of the invention will become apparent from the following detailed description made with reference to the accompanying drawings, wherein.

DETAILED DESCRIPTION OF THE INVENTION

This Detailed Description of the Invention merely describes embodiments of the invention and is not intended to limit the scope of the claims in any way. Indeed, the invention as described by the claims is broader than and unlimited by the preferred embodiments, and the terms in the claims have their full ordinary meaning.

The present invention contemplates a locking clamp configured to be lockably secured in one or more clamping positions, for example, to restrict manipulation or movement of one or more components being clamped. In one such application, a locking clamp may be utilized as a lockout device for preventing access to or operation of a valve (or other such instrument) by restricting movement of the valve handle with respect to the valve body. As described herein, movement of a valve handle with respect to a valve body may be restricted by clamping adjacent or abutting portions of the handle and body together. As one example, a shutoff valve, such as a ball valve or gate valve, typically includes a body stop or tang that abuts a handle stop when the valve is in the closed condition. By clamping the body stop against the handle stop, rotation of the valve handle to open the valve may be prevented.

Figure 1:
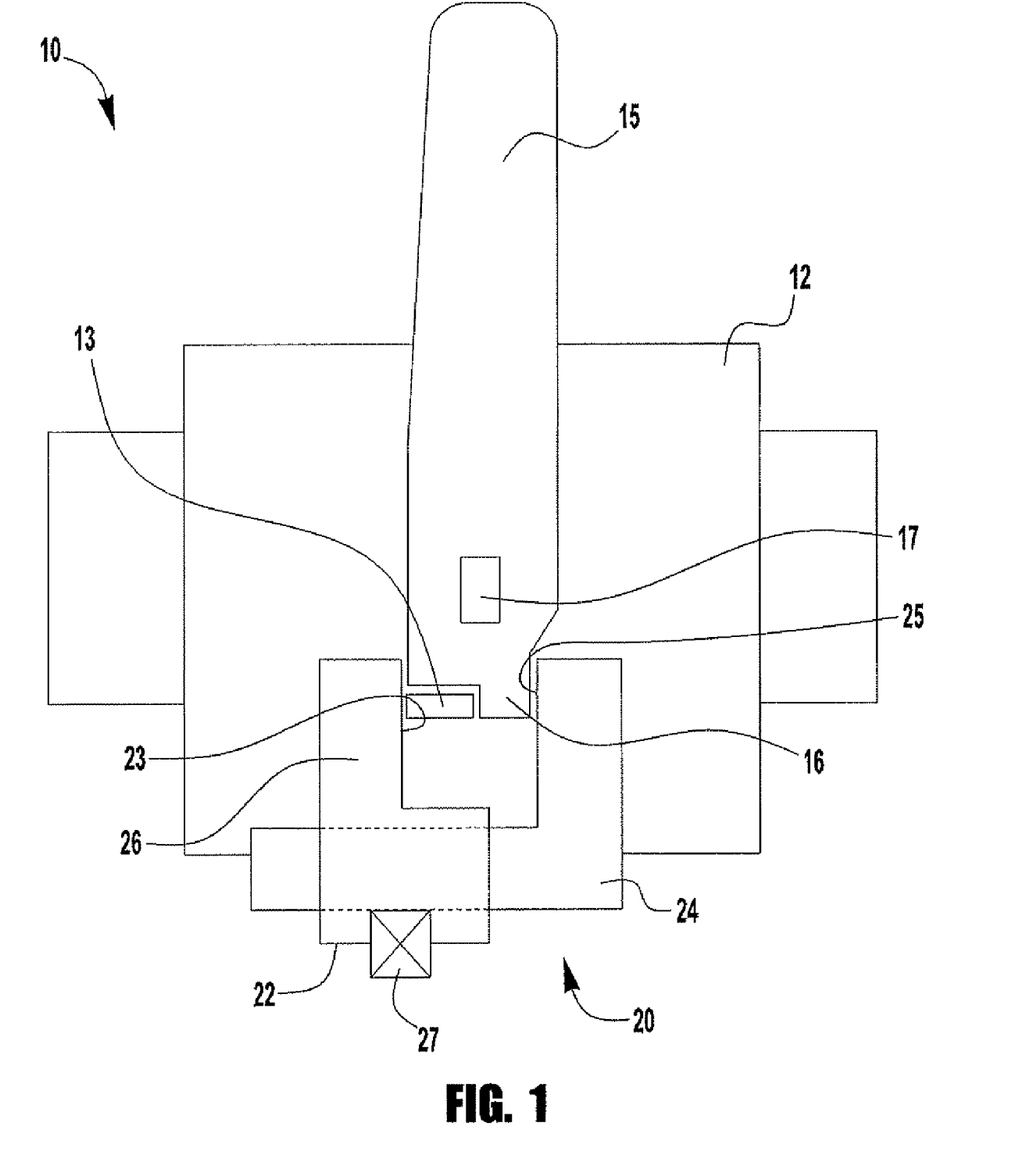
FIG. 1 is a top schematic view of a locking clamp assembled with a valve.

A top schematic view of an exemplary valve is illustrated in FIG. 1. The valve 10 includes a valve body 12 and a valve handle 15 rotatable to rotate a valve stem 17, for example, to open or close the valve 10. The valve body 12 includes a body stop 13 that abuts a corresponding stop 16 on the handle 15 when the valve is in a first condition (e.g., fully closed or fully open). When the handle 15 is rotated to actuate the valve out of the first condition, the handle stop 16 separates from the body stop 13. To prevent the valve from actuating out of the first condition, the handle stop 16 may be clamped against the body stop 13, as in the position shown in FIG. 1.

While many different devices may be utilized to clamp the handle stop against the body stop, in one embodiment (as shown in FIG. 1), a lockout device 20 may include first and second clamping members 22, 24 in sliding engagement with each other. The clamping members 22, 24 include opposed clamping surfaces 23, 25 that may be spaced apart to receive the handle stop 16 and body stop 13 between them. The second clamping member 24 may be moved to a clamping position to clamp the handle stop 16 and body stop 13 between the clamping surfaces 23, 25. As shown, the first clamping member 22 may include a base member 26 (such as, for example, a housing, frame, or other structure) and a locking member (shown schematically at 27) movable (with respect to the base member) from a releasing position to a securing position to secure the second clamping member 24 in the clamping position. As will be described in greater detail below, the lockout device 20 may (but need not) include a mechanism for locking the locking member 27 in the securing position (for example, to prevent unauthorized removal of the lockout device from the valve).

Many different components and configurations may be utilized to secure the second clamping member in the clamping position. As one example, the first clamping member may include a locking catch having an interlocking feature configured to interlock with a corresponding interlocking feature of the second clamping member when the locking member is in the securing position. Any suitable interlocking features may be provided, including, for example, detents, frictional surfaces, or interlocking teeth. The interlocking features may (but need not) permit the second clamping member to be secured in a plurality of clamping positions, for example, for use with valves of different sizes or types.

FIGS. 2A-7 illustrate an exemplary locking clamp 100 for securing a manually operable instrument in a first position. While the figures and descriptions illustrate and describe an embodiment adapted for use as a lockout device with a valve having a rotatable handle with a handle stop that abuts a body stop in a first position, many of the features of the exemplary embodiments may be used with other locking clamps and with lockout devices for different types of valves and other instruments. The inventive features of the devices described herein may be beneficial for many applications, such as, for example, where two or more components must be securely clamped together, or where an instrument must be locked, such as, for example, in applications where maintenance personnel are servicing a fluid system or factory equipment with which a fluid system is connected, where an instrument, such as a valve, is known to be faulty, or where a control setting must not be altered. Applications may include permanent and temporary lockouts. The devices according to the present invention are durable under normal use and may be used repeatedly and indefinitely.

The device 100 of the illustrated embodiment includes a base member 120 in sliding engagement with an extension arm 140. While the base member 120 and extension arm 140 may be assembled together in any suitable configuration, in the illustrated embodiment, the extension arm 140 slidably extends through a passage 121 in the base member 120. One or more posts 142 or other such retaining features may be provided on the extension arm 140 to prevent fill withdrawal of the extension arm 140 from the passage 121. The base member may include front and rear body halves 120a, 120b assembled (for example, using fasteners 123, see FIGS. 5A, 5B, and 7) over the extension arm 140.

Figure 3A:
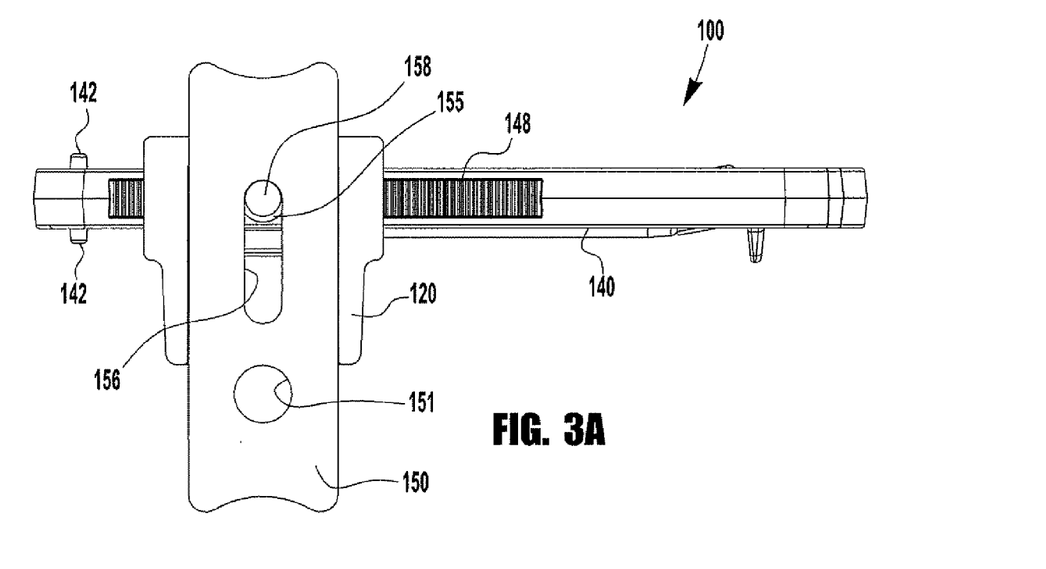
FIG. 3A is a top cross-sectional view of the locking clamp of FIG. 2A, shown in the secured condition.
Figure 4A:
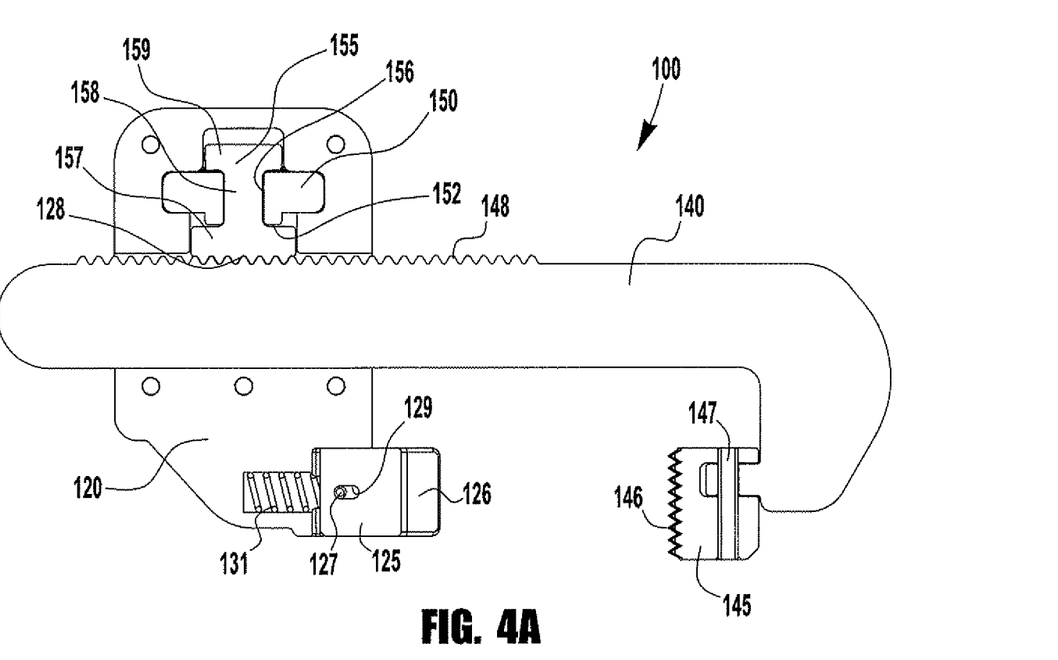
FIG. 4A is a front cross-sectional view of the locking clamp of FIG. 2A, shown in the secured condition.
Figure 5A:
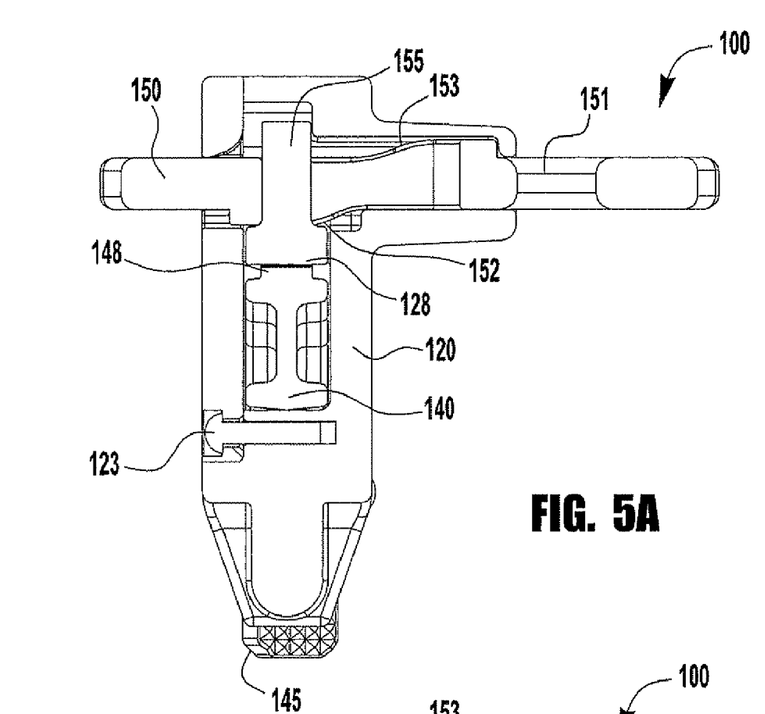
FIG. 5A is a left side cross-sectional view of the locking clamp of FIG. 2A, shown in the secured condition.

The base member 120 and extension arm 140 each include pads 125, 145 having opposed clamping surfaces 126, 146 for receiving components to be clamped together (e.g., abutting portions of a valve body and valve handle) therebetween. The exemplary extension arm 140 includes a plurality of teeth or rack portion 148 (although other interlocking features may be used). Disposed within the base member 120 is a locking catch or pawl 155 having an interlocking feature (teeth 128) configured to interlock with the teeth 148 of the extension arm 140 when the locking catch 155 engages the extension arm 140. In other embodiments (not shown), the interlocking feature may be integral to the base member. While many different configurations may be utilized to engage the locking catch 155 with the extension arm 140, in the illustrated embodiment, a slidable lock bar 150 includes a camming surface 152 that forces the locking catch 155 into interlocking engagement with the extension arm 140 when the lock bar 150 is moved into a securing position (as shown in FIGS. 3A, 4A, and 5A). This interlocking condition secures the extension arm 140 against movement out of the clamping position.

Figure 3B:
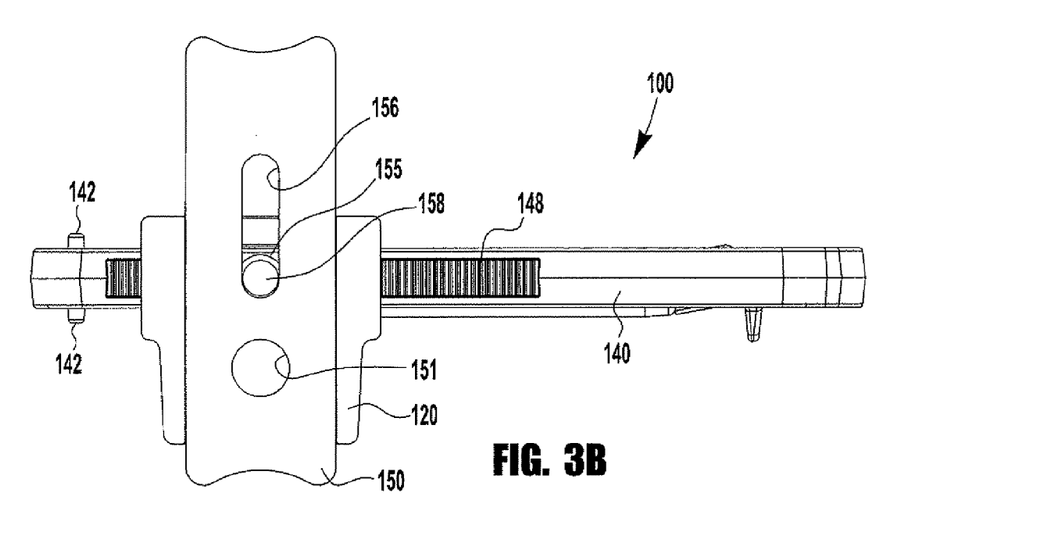
FIG. 3B is a top cross-sectional view of the locking clamp of FIG. 2A, shown in the adjustable condition.
Figure 4B:
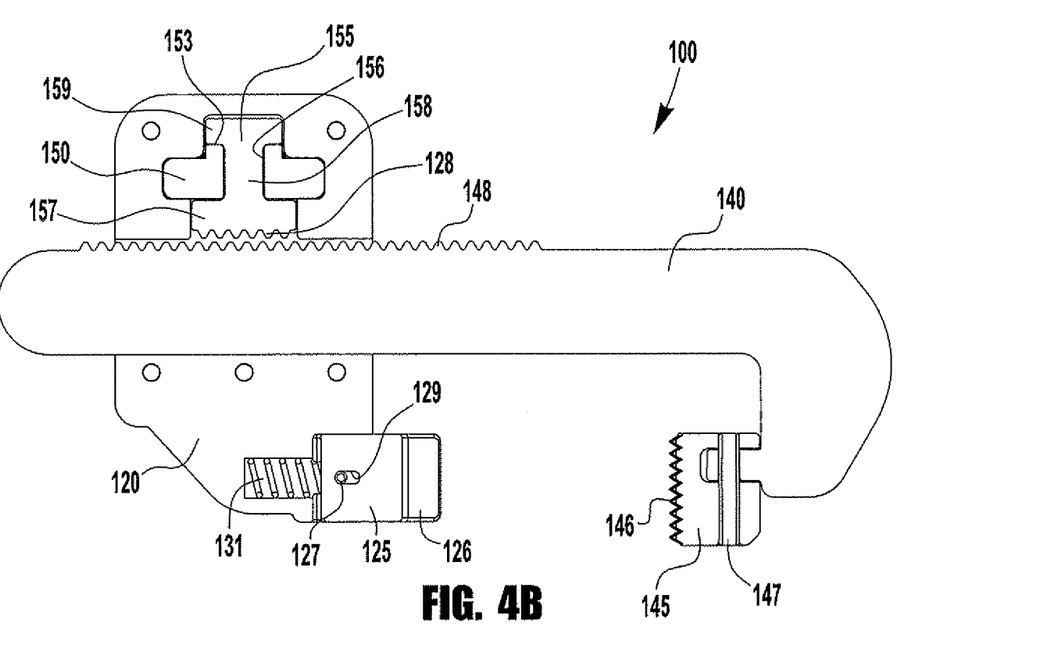
FIG. 4B is a front cross-sectional view of the locking clamp of FIG. 2A, shown in the adjustable condition.
Figure 5B:
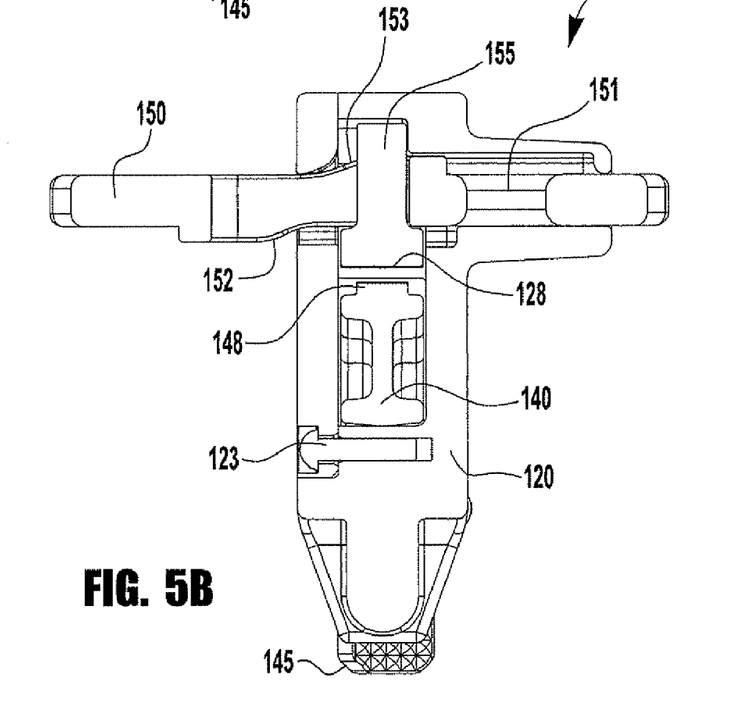
FIG. 5B is a left side cross-sectional view of the locking clamp of FIG. 2A, shown in the adjustable condition.
Figure 6A:
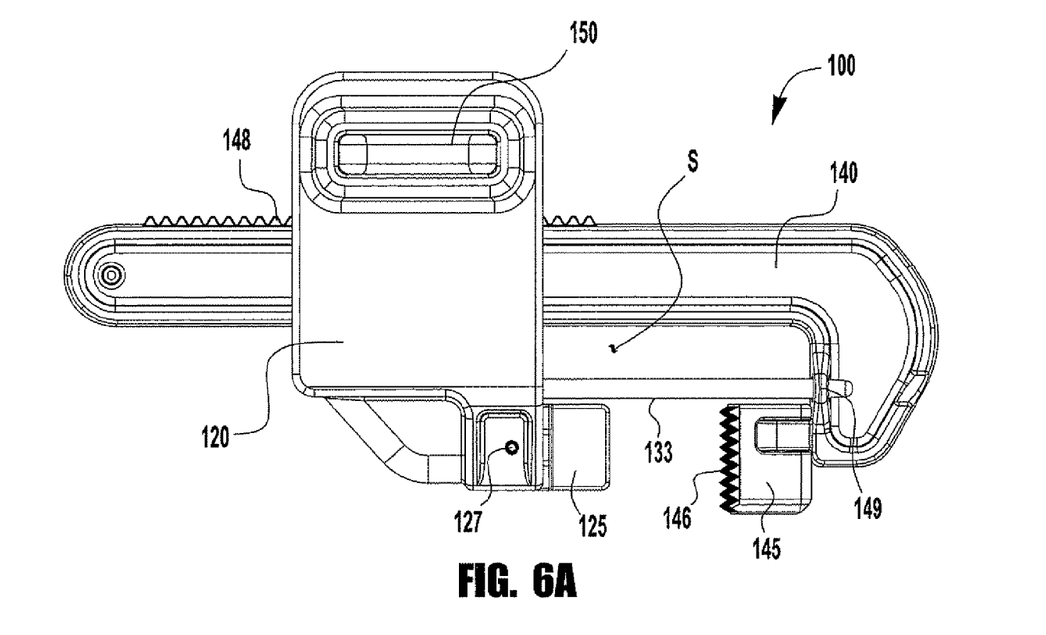
FIG. 6A is a front view of the locking clamp of FIG. 2A, shown in a secured clamping position.
Figure 6B:
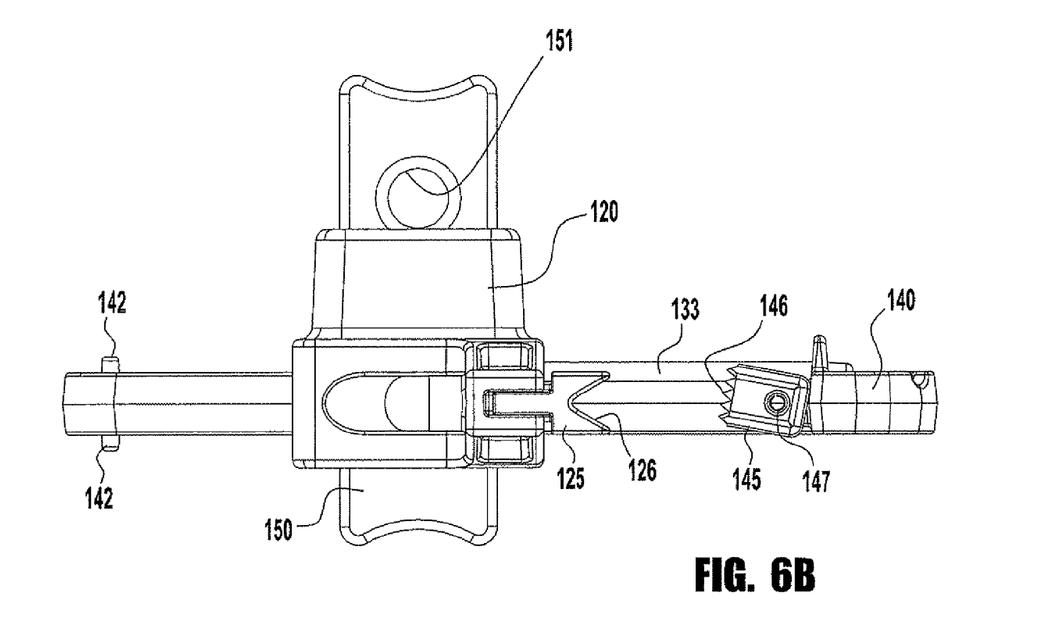
FIG. 6B is a bottom view of the locking clamp of FIG. 2A, shown in the secured clamping position.
Figure 7:
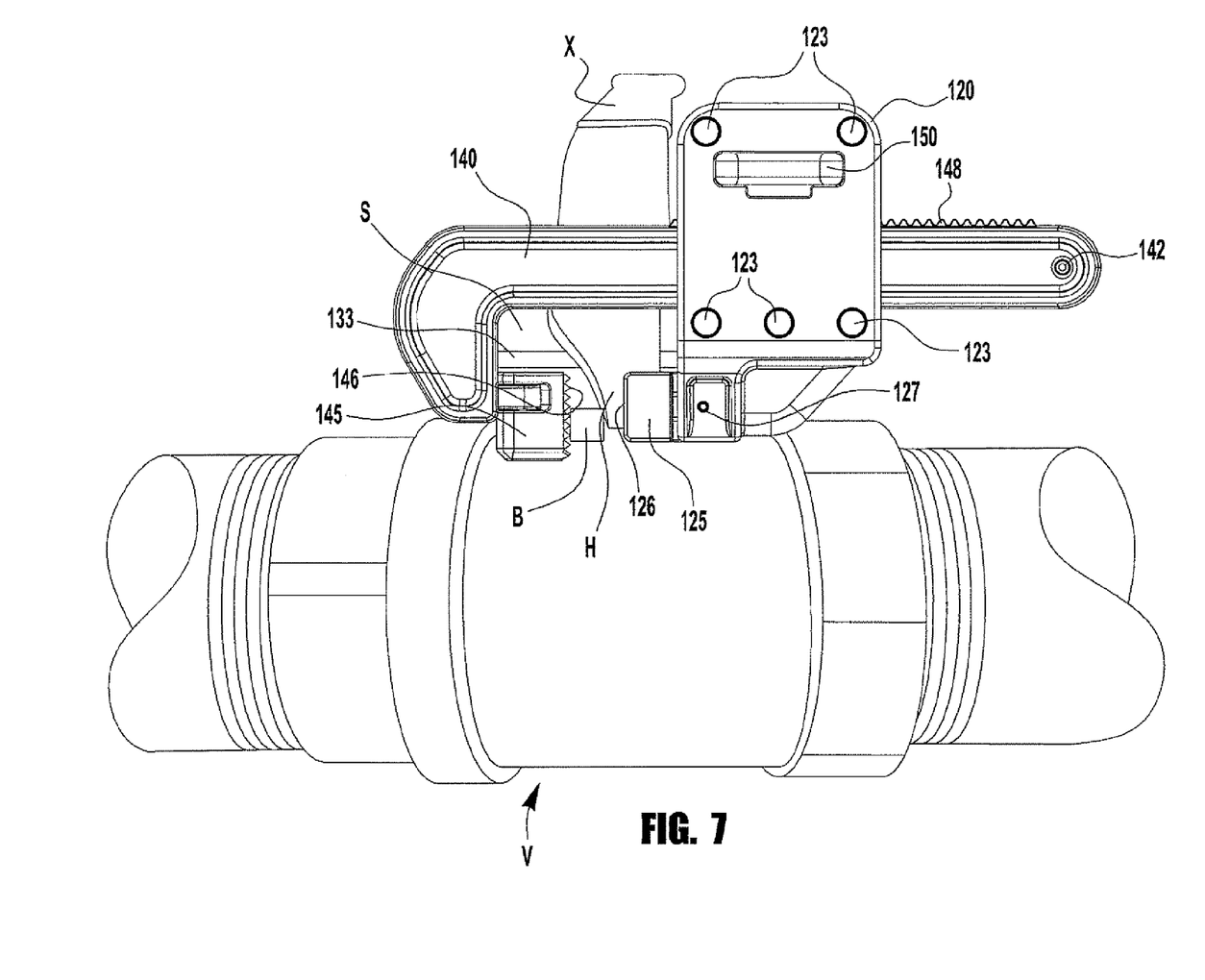
FIG. 7 is a rear view of the locking clamp of FIG. 2A, shown clamped to a valve in the secured clamping position.

To release the extension arm 140 from the clamping position (for example, for movement to a different clamping position or to remove the device 100 from the clamped components), the lock bar is moved from the securing position to the releasing position (as shown in FIGS. 3B, 4B, and 5B), which disengages the camming surface 152 from the locking catch 155. This may allow for disengagement of the interlocking features 128, 148 of the locking catch 155 and extension arm 148 for movement of the extension arm 140 (for example, as a result of force being applied to the extension arm 140). The device 100 may further be configured to hold the locking catch 155 out of engagement with the extension arm 140 when the lock bar 150 is moved to the releasing position. As one example (not shown), the base member may include a biasing member (such as, for example, a compressed spring or flexible tab) that moves the locking catch 155 out of engagement with the extension arm 140 upon disengagement of the camming surface 152 from the locking catch 155. As another example, as shown in the illustrated embodiment (see FIG. 5B), the lock bar 150 may include a second camming surface 153 configured to force the locking catch 155 out of engagement with the extension arm 140 when the lock bar 150 is moved to the releasing position. In the illustrated embodiment, the lock bar 150 includes a slot 156 receiving a central portion 158 of the locking catch 155 (see FIGS. 3A and 3B), allowing the lock bar to slide with respect to the laterally fixed locking catch 155. When the lock bar 150 is moved to the securing position (see FIG. 4A), a lower portion 157 of the locking catch 155 is engaged by the lower, first camming surface 152 to force the locking catch 155 into interlocking engagement with the extension arm 140. When the lock bar 150 is moved to the releasing position (FIG. 4B), an upper portion 159 of the locking catch 155 is engaged by the upper, second camming surface 153 to force the locking catch 155 out of interlocking engagement with the extension arm 140.

Figure 2A:
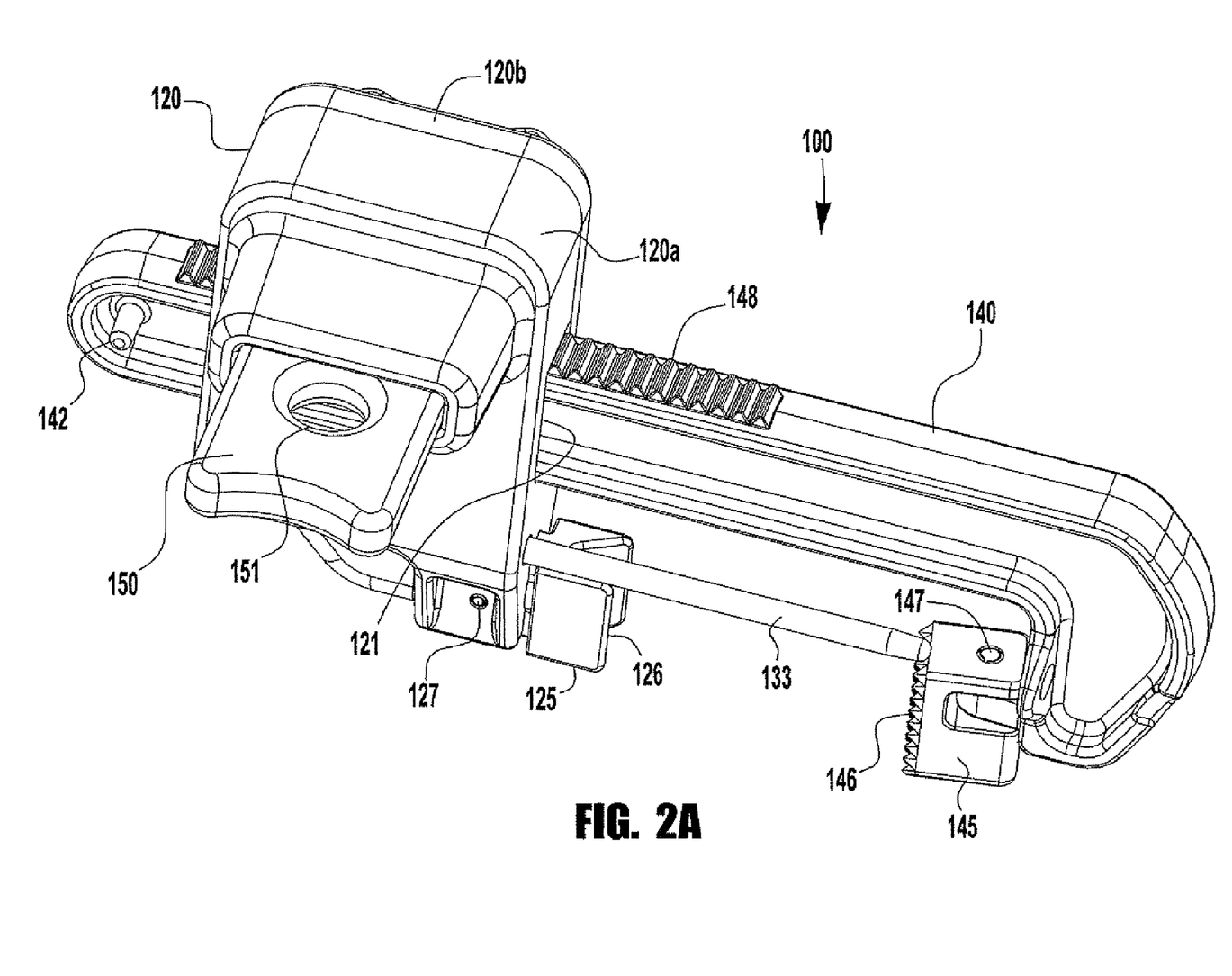
FIG. 2A is an upper perspective view of a locking clamp shown in a secured condition.
Figure 2B:
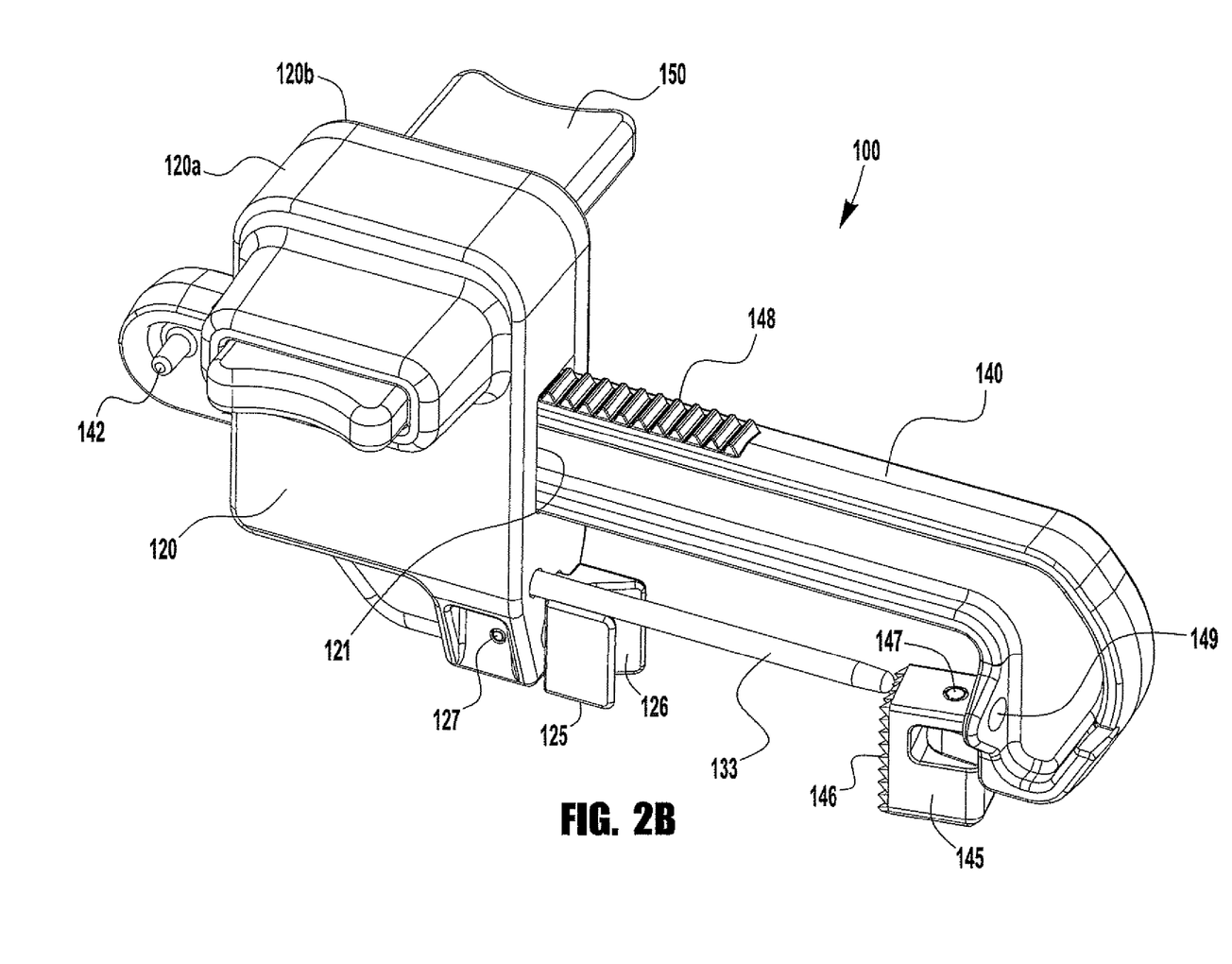
FIG. 2B is an upper perspective view of the locking clamp of FIG. 2A, shown in an adjustable condition.

According to another inventive aspect of the present application, the device may be configured to allow the lock bar to be locked in the securing position, to prevent inadvertent or intentional removal of the device from clamped components. In one embodiment (not shown), the device may include an integrated locking mechanism (such as, for example, a key cylinder lock or combination lock) that lockingly secures the lock bar in the securing position. In another embodiment, the device may include a lock aperture configured to receive an obstruction (such as, for example, a padlock shackle, cable lock, or tie) to prevent movement of the lock bar from the securing position to the releasing position. In the illustrated embodiment, a lock aperture 151 is disposed in a portion of the lock bar 150 that protrudes from the base member 120 when the lock bar 150 is in the securing position (FIGS. 2A and 3A), and that retracts into the base member 120 when the lock bar 150 is in the releasing position (FIGS. 2B and 3B). Insertion of an obstruction (not shown) through the lock aperture 151 prevents retraction of the lock aperture 151 into the base member 120, thereby preventing movement of the lock bar 150 from the securing position to the releasing position. As a result, the lock bar 150 may be locked in the securing position and the extension arm 140 may be locked in the selected clamping position. In one example, the device may be configured such that the lock aperture 151 must be fully retracted into the base member 120 for disengagement of the locking catch 155 from the extension arm 140. Thus, any size obstruction (smaller than the lock aperture 151 in cross section) may be inserted through the lock aperture 151 to prevent full retraction of the lock aperture 151 into the base member 120, to lock the device 100 in the clamping position.

According to another inventive aspect of the present application, the clamping surfaces may be adapted to better conform with, grip against, or otherwise secure the clamped components. As one example, a clamping surface may be provided with a high friction surface to improve gripping of a clamped component (for example, an uneven or curved surface of a valve body). For example, the clamping pad 145 of the extension arm 140 on the illustrated device 100 includes a diamond pattern clamping surface 146 to enhance gripping. In another embodiment, the angle or orientation of the clamping surface may be adjustable to accommodate angled components to be clamped. For example, the clamping pad 145 of the extension arm 140 on the illustrated device 100 is pivotable about a vertically oriented pivot pin 147 to adjust the angular orientation of the clamping surface 146. In still another embodiment, a clamping surface may be shaped to retain an edge (or other narrow portion, such as the edge of a valve handle stop) of a component to be clamped. For example, a clamping surface may include side edges extending forward of a recessed central portion to retain a narrow component between these edges. As another example, a clamping surface may be V-shaped to tightly retain components of varying thicknesses between the clamping surfaces edges. In the illustrated embodiment, the clamping pad 125 of the base member 120 includes a V-shaped vertical cross-section (see FIG. 6B).

In still another embodiment, a clamping surface may be compressible (or longitudinally adjustable) to increase a clamping grip (for example, on components with uneven surfaces), or to allow the clamping surfaces to accommodate components requiring spacing between the clamping surfaces that is greater than a first clamping position but less than an adjacent clamping position (for example, incremental interlocking positions of mating teeth 128, 148 of the illustrated locking catch 155 and extension arm 140). As one example, a clamping pad may be provided in a compressible material, such that the pad compresses or deforms to accommodate dimensional variances. As another example, a clamping pad may be spring-loaded to allow for longitudinal movement to accommodate dimensional variances in the clamped components. In the illustrated embodiment (see FIGS. 4A and 4B), the clamping pad 125 of the base member 120 is spring-loaded (by spring 131) and slideable on a retaining pin 127 (which extends through a slot 129 in the pad 125) to allow for adjustment of the longitudinal position of the clamping surface 126. While any amount of adjustment or compressibility may be provided for, in one embodiment, the pad 125 may be configured to move as much as the distance between incremental clamping positions (e.g., one tooth thickness) to accommodate desired clamping surface spacing between incremental interlocking positions of the locking catch 155 and extension arm 140. Other configurations in which the pad moves smaller or greater distances are contemplated in the practice of the invention.

According to another inventive aspect of the present application, a locking clamp may be further configured to prevent removal of the locking clamp from the clamped portions due to tampering (for example, prying or pulling the locking clamp to slide the clamping surfaces away from the clamped components). In one embodiment, a locking clamp is provided with a retaining member configured to be inserted through a portion of the components to be clamped, such that when the locking clamp is clamped onto the components (e.g., a valve body and handle), the retaining member extends past one or both clamping surfaces (i.e., into the gap between the opposed clamping surfaces) to obstruct tampering efforts to pull the locking clamp away from the clamped components. In one example, a retaining member is positioned proximate to the clamping surfaces and is configured to span the clamping surfaces when the locking clamp is in the desired clamping position.

A retaining member for a locking clamp may be provided in any suitable shape or orientation, and may, for example, be affixed to one of a base member and an extension arm. In the illustrated embodiment, a retaining rod 133 is affixed to the base member 120 proximate to the clamping pad 125 and extends toward the clamping pad 145 of the extension arm 140. When the extension arm 140 is moved to a clamping position, the retaining rod 133 spans the first and second clamping surfaces 126, such that the retaining rod 133 may block removal of a portion of a clamped component received in a space S (see FIGS. 6A and 7) between the retaining rod 133 and the extension arm 140. Further, the retaining rod 133 may be configured to extend through an opening 149 in the extension arm 140 (see FIG. 6A) when the extension arm 140 is in a clamping position, to further obstruct removal of the device 100 from the clamped components.

While many materials may be used to construct the components of the locking clamp, including, for example, various plastics and metals, in one embodiment, the locking clamp may be constructed of materials chosen for high strength and heat resistance properties, for example, for use in high temperature system applications. In an exemplary embodiment, the base member 120, lock bar 150, locking catch 155, and extension arm 140 are provided in copper-nickel plated zinc diecast, and the clamping pads 125, 145 and retaining rod 133 are provided in steel.

While a lockable clamp including inventive features of the present application may be utilized in many different clamping, locking, and lockout applications, in one embodiment, a locking clamp 100, as shown, may be used as a lockout device with a handle-operated valve having a handle stop that abuts a valve body stop when the valve is in a first condition (e.g., a closed condition). To use the locking clamp 100 illustrated in FIGS. 2A-7 with such a valve V, according to one exemplary method, the valve handle X is rotated to abut the valve handle stop H with the valve body stop B (see FIG. 7), placing the valve V in the desired condition (e.g., the closed condition). The retaining member 133 is inserted between the handle stop H and the valve stem (not shown). The body and handle stop portions B, H are then positioned between first and second clamping surfaces 126, 146 of a first clamping member (base member 120) and a second clamping member (extension arm 140) of the locking clamp 100. The second clamping member 140 is slid to a clamping position, such that the body stop B is clamped against the handle stop H between the first and second clamping surfaces 126, 146. The retaining member 133 extends to span the clamping surfaces 126, 146 to retain the locking clamp 100 on the valve V. The base member 120 is then interlocked with the extension arm 140 by sliding the lock bar 150 with respect to the base member 120 from a releasing position to a securing position, which engages a camming surface 152 with a locking catch 155 to force teeth 128 on the locking catch into interlocking engagement with corresponding teeth 148 on the extension arm 140 (see FIGS.

4A and 5A). The first and second clamping members are then locked in interlocking engagement with each other, by inserting an obstruction (e.g., a padlock shackle) through a lock aperture 151 (see FIG. 6B), which prevents movement of the lock bar 150 from the securing position to the releasing position.

To remove the exemplary locking clamp 100 from the locked out valve, the obstruction is removed from the lock aperture 151, and the lock bar 150 is moved from the securing position to the releasing position. A second camming surface 153 on the lock bar 150 engages the locking catch 155 to disengage the teeth 128 of the locking catch 155 from the teeth 148 of the extension arm 140 (see FIGS. 4B and 5B), allowing the extension arm 140 to slide within the base member to release the body and handle stops B, H from the clamping surfaces 126, 146 and to withdraw the retaining rod 133 from between the handle stop H and the valve stem.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A device comprising:
    a first clamping member having a base member with a first clamping surface and a locking member assembled with the base member and movable with respect to the base member between a securing position and a releasing position; and
    a second clamping member slidably engaged with the first clamping member and selectively movable to a plurality of clamping positions, the second clamping member having a second clamping surface opposite the first clamping surface;
    wherein the locking member is configured to secure the second clamping member in one of the plurality of clamping positions when the locking member is in the securing position, the locking member further being configured to permit movement of the second clamping member out of the one of the plurality of clamping positions when the locking member is in the releasing position;
    further wherein the locking member comprises a locking catch having a first interlocking feature configured to interlock with a second interlocking feature of the second clamping member when the locking member is in the securing position, the locking member further comprising a lock bar selectively movable with respect to the locking catch, such that the lock bar forces the locking catch into interlocking engagement with the second clamping member when the locking member is in the securing position; and
    wherein the locking member includes a lock aperture configured to receive an obstruction to obstruct movement of the locking member from the securing position to the releasing position.

2. The device of claim 1, wherein the lock bar includes a camming surface configured to hold the locking catch in interlocking engagement with the second clamping member when the locking member is in the securing position.

3. The device of claim 2, wherein the lock bar further comprises a second camming surface configured to hold the locking catch out of interlocking engagement with the second clamping member when the locking member is in the releasing position.

4. The device of claim 2, wherein the means for selectively preventing user movement of the locking member from the securing position to the releasing position comprises a lock aperture disposed in the lock bar, wherein at least a portion of the lock aperture must be retracted into the base member for disengagement of the locking catch from the second clamping member.

5. The device of claim 1, wherein the first and second interlocking features each comprise a plurality of teeth.

6. The device of claim 1, wherein at least one of the first and second clamping surfaces is disposed on a pivotable pad.

7. The device of claim 1, wherein at least one of the first and second clamping surfaces is disposed on a compressible pad.

8. The device of claim 1, wherein at least one of the first and second clamping surfaces is disposed on a spring loaded pad.

9. The device of claim 1, wherein at least one of the first and second clamping surfaces comprises side edges extending forward of a recessed central portion.

10. The device of claim 9, wherein the side edges and central portion form a V-shaped cross section.

11. The device of claim 1, further comprising a retaining member affixed to one of the first and second clamping members, the retaining member being configured to span the first and second clamping surfaces when the second clamping member is in one of the plurality of clamping positions.

12. A lockout device for an instrument having a body and a rotatable handle extending from the body for operating the instrument, the lockout device comprising:
    a base member having a first clamping surface;
    an extension arm slidably engaged with the base member and selectively movable with respect to the base member to a plurality of clamping positions, the extension arm having a second clamping surface opposite the first clamping surface for clamping a portion of each of the body and handle therebetween;

a locking catch disposed within the base member, the locking catch having a first interlocking feature configured to selectively interlock with a second interlocking feature of the extension arm to secure the extension arm in one of the plurality of clamping positions; and a slidable lock bar movable with respect to the locking catch between a securing position and a releasing position, the lock bar including a camming surface that forces the locking catch into interlocking engagement with the extension arm when the lock bar is in the securing position, and a lock aperture configured to prevent movement of the lock bar from the securing position to the releasing position when an obstruction is inserted through the lock aperture.

13. The lockout device of claim 12, wherein at least a portion of the lock aperture must be retracted into the base member for disengagement of the locking catch from the second clamping member.

14. The lockout device of claim 12, wherein the lock bar further comprises a second caroming surface configured to hold the locking catch out of interlocking engagement with the extension arm when the lock bar is in the releasing position.

15. The lockout device of claim 12, further comprising a retaining member affixed to one of the base member and extension arm, the retaining member being configured to span the first and second clamping surfaces when the extension arm is in one of the plurality of clamping positions.

* * * * *